US012755529B2

(12) United States Patent
Scharf et al.

(10) Patent No.: US 12,755,529 B2
(45) Date of Patent: Oct. 6, 2026

(54) DAMAGE DETECTION AND IMAGE ALIGNMENT BASED ON POLYGONAL REPRESENTATION OF OBJECTS

(71) Applicant: Spark Insights, Inc., Boston, MA (US)

(72) Inventors: Ira Scharf, Newton, MA (US); Xiang Wen, Westwood, MA (US); Paul Cummer, Cambridge, MA (US); Feng Pan, Belmont, MA (US); Vidyavathy Renganathan, Albany, NY (US)

(73) Assignee: Concirrus Ltd., London (GB)

( * ) Notice: Subject to any disclaimer, the term of this patent is extended or adjusted under 35 U.S.C. 154(b) by 327 days.

(21) Appl. No.: 18/275,558

(22) PCT Filed: Jan. 28, 2022

(86) PCT No.: PCT/US2022/014196
§ 371 (c)(1),
(2) Date: Aug. 2, 2023

(87) PCT Pub. No.: WO2022/169679
PCT Pub. Date: Aug. 11, 2022

(65) Prior Publication Data

US 2024/0096090 A1 Mar. 21, 2024

Related U.S. Application Data

(60) Provisional application No. 63/145,021, filed on Feb. 3, 2021.

(51) Int. Cl.
*G06V 20/10* (2022.01)
*G06N 3/0464* (2023.01)
(Continued)

(52) U.S. Cl.
CPC .............. *G06V 20/176* (2022.01); *G06T 7/13* (2017.01); *G06T 7/60* (2013.01); *G06V 10/24* (2022.01);
(Continued)

(58) Field of Classification Search
CPC .... G06V 20/176; G06V 10/24; G06V 10/761; G06T 7/13; G06T 7/60;
(Continued)

(56) References Cited

U.S. PATENT DOCUMENTS 9,437,034 B1 * 9/2016 Wei .......................... G06T 17/00
9,589,210 B1 * 3/2017 Estrada ............. G06F 18/24137
(Continued)

OTHER PUBLICATIONS

Tilon, S.; Nex, F.; Kerle, N.; Vosselman, G. Post-Disaster Building Damage Detection from Earth Observation Imagery Using Unsupervised and Transferable Anomaly Detecting Generative Adversarial Networks. Remote Sens. 2020, 12, 4193. https://doi.org/10.3390/rs12244193 (Year: 2020).*
(Continued)

*Primary Examiner* — Gregory A Morse
*Assistant Examiner* — Ronde Lee Miller
(74) *Attorney, Agent, or Firm* — Young Basile Hanlon & MacFarlane, P.C.

(57) ABSTRACT

Disclosed are implementations that include a method for detecting damage in a geographical area, including receiving a first image of the geographical area, captured after occurrence of a damage-causing event in the geographical area, and obtaining a second image of the geographical area, the second image including image data of the geographical area prior to the occurrence of the damage-causing event, with the first and second images containing an overlapping portion comprising one or more common objects. The method also includes obtaining markers for the first and second
(Continued)

images, with the markers being geometrical shapes corresponding to objects in the first and second images, and determining damage suffered by an object, from the one or more common objects, based on differences between a first geometrical shape corresponding to the object appearing in the first image and a second geometrical shape corresponding to the object appearing in the second image.

12 Claims, 8 Drawing Sheets

(51) Int. Cl.

| | |
|---|---|
| ***G06N 3/08*** | (2023.01) |
| ***G06N 3/09*** | (2023.01) |
| ***G06T 7/13*** | (2017.01) |
| ***G06T 7/254*** | (2017.01) |
| ***G06T 7/33*** | (2017.01) |
| ***G06T 7/60*** | (2017.01) |
| ***G06V 10/24*** | (2022.01) |
| ***G06V 10/74*** | (2022.01) |

(52) U.S. Cl.
CPC .. *G06V 10/761* (2022.01); *G06T 2207/10032* (2013.01); *G06T 2207/30184* (2013.01); *G06T 2207/30204* (2013.01)

(58) Field of Classification Search
CPC . G06T 2207/10032; G06T 2207/30184; G06T 2207/30204; G06T 2207/20084; G06T 7/33; G06T 2207/20081; G06T 2207/30181; G06T 7/254; G06N 3/08
See application file for complete search history.

(56) References Cited

U.S. PATENT DOCUMENTS

| | | | | |
|---|---|---|---|---|
| 10,061,474 | B2 * | 8/2018 | Bertoldo | G06F 3/0482 |
| 10,339,646 | B1 * | 7/2019 | Adler | G06T 7/73 |
| 10,546,195 | B2 * | 1/2020 | Lo | G01C 11/02 |
| 11,636,649 | B2 * | 4/2023 | Lieb | G06T 7/35 345/424 |
| 2014/0064554 | A1 * | 3/2014 | Coulter | G06T 7/254 382/294 |
| 2014/0270449 | A1 * | 9/2014 | Hipp | G06T 7/0016 382/131 |
| 2020/0226745 | A1 * | 7/2020 | Adler | G06T 7/73 |
| 2021/0334582 | A1 * | 10/2021 | Erez | G06T 7/11 |

OTHER PUBLICATIONS

Joseph Z. Xu, Wenhan Lu, Zebo Li, Pranav Khaitan, Valeriya Zaytseva. Building Damage Detection in Satellite Imagery Using Convolutional Neural Networks. arXiv:1910.06444 https://doi.org/10.48550/arXiv.1910.06444 (Year: 2019).*

Aydan Menderes et al., "Automatic Detection of Damaged Buildings after Earthquake Hazard by Using Remote Sensing and Information Technologies", World Multidisciplinary Earth Sciences Symposium (WMESS 2015), Procedia Earth and Planetary Science 15 (2015), pp. 257-262, Sep. 2015 pp. 257, 260-261.

Nicolas Girard et al., "End-to-End Learning of Polygons for Remote Sensing Image Classification", 2018 IEEE International Geoscience and Remote Sensing Symposium (IGARSS 2018), pp. 2083-2083, Jul. 2018 p. 2083; and figure 3.

International Search Report and Written Opinion, PCT Application No. PCT/US2022/014196, mailed May 3, 2022 (8 pages).

* cited by examiner

DAMAGE DETECTION AND IMAGE ALIGNMENT BASED ON POLYGONAL REPRESENTATION OF OBJECTS

CROSS REFERENCE TO RELATED APPLICATIONS

This application is a 371 national stage application of PCT Application No. PCT/US2022/014196, filed Jan. 28, 2022, which claims priority to U.S. Provisional Application No. 63/145,021, filed Feb. 3, 2021, the contents of which are hereby incorporated by reference in their entireties.

BACKGROUND

Damage-causing events, such as fires, flooding, earthquakes, etc., can cause substantial structural damage to large swaths of geographical areas. To assess the economic damage resulting from the occurrence of such events, overhead photographs can be used. However, the level of detail in such photos varies according to the equipment that may have been used to capture the photos, the altitude at which the photos were taken, and a host of other factors that can complicate the accuracy of damage assessment. This problem may be exacerbated when the assessment of damage is based on comparison of pre- and post-images (i.e., images taken before and after occurrence of a damage-causing event, with such images possibly captured using different equipment, and under different viewing conditions) of the geographical area that includes the structures with respect to which damage assessment is to be made.

Furthermore, when relying on a differential model for assessing damages in a particular geographical area, the pre- and post-images need to be aligned so that the correct objects and features appearing in the images are properly compared. However, variations in the level of detail provided in images can make such alignment of such images challenging.

SUMMARY

Disclosed are systems, methods, and other implementations to detect/estimate damage suffered by objects (e.g., physical structures, such as buildings) based on determined changes to outlines (or other markers) of structures (identified in an image for a particular geographical area) when compared to generated outlines for features/structures appearing in baseline images obtained for the particular geographical area. The use of polygonal shapes to approximate dimensions of structures simplifies the damage assessment process by normalizing detailed image data into geometric approximations that can more easily be compared. This can be advantageous in situations where the images for a particular geographical area are being captured by different devices mounted on different platforms (e.g., different satellites or other aerial vehicles) traveling at different altitudes over the geographical area, or when the images compared are not of the same type (e.g., one is a DSM image, and the other is a regular image captured with a light-capture device). Thus, in such embodiments, a learning model can be implemented for a learning machine to identify markers in a pre-damage image and in a post-damage image (such markers can be first used to align the images, although image alignment can be performed based on other data, such as location data, obtained or determined for the images). If some of the markers are absent or changed, this can be used to identify damage (and/or the extent of damage) suffered by the structures detected in the images. The pre-damage image (i.e., containing baseline information) can be obtained from the same platform and equipment used to obtain the current (post-damage) image, or can alternatively be derived according to other sources of information, including, for example, images captured with different equipment and/or from a different platforms, from historical data representative of the geographical area (e.g., old images), digital surface model images (DSM) obtained from third-parties prior to occurrence of a damage-causing event in the geographical area being analyzed, etc.

There are several ways and approaches that can be implemented to determine sustained damage. In one such approach, a trained learning machine, implementing an outline-generating model, produces output images containing outlines of structures (e.g., salient structures that are clearly distinct from the foreground or background of the image) detectable in the images. Alternatively, a filtering-based approach to perform image processing (e.g., edge detection), which may be used in conjunction with the learning machine approach, may be applied to the images being analyzed.

Next, small deviations between outlines (e.g., polygonal outlines) determined for images obtained after occurrence of a damage-causing event, and respective outlines of the structures outlines as they appeared in images obtained prior to the occurrence of the damage causing event are computed. This can be realized either using filtering-based approaches (implementing image processing techniques to analyze the outlines produced from the raw input images), or based on learning machines trained to analyze dimensions and orientations of features detected in an image. For example, in the filtering-based approach (also referred to as an analytic or algorithmic approach) the dimensions and orientations (e.g., angles between adjacent segments) of the polygonal segments are determined, and some measure/score representative of the aggregate of the deviations is computed to thus provide a value representative of the approximate extent of change and/or damage to the structure.

In another approach, an automated model to measure and compare the areas enclosed by outlines of features (e.g., roofs) of detectable structures appearing in pre- and post-imagery of a damage-causing event can be used to determine extent of damage. The percent reduction in area for each roof can be indicative of damage sustained by the property, and can solve the difficult issue of formulating the damage measurement as a coherent machine learning problem. This approach provides robust performance and interpretability for model predictions to estimate costs and other considerations resulting from this type of damage quantification. Such a model also generalizes better across disaster types, saving time and expense that would otherwise be required to build more specific models for each potential type of damage.

The latter approach may implement the following process: 1) a large variety of pre-disaster imagery is labeled with complex polygons marking the roof of each building, 2) a deep semantic segmentation model is trained to convert the raw image into a map of these bounding boxes, and 3) the model is fine-tuned to predict bounding boxes corresponding to partially intact roofs in post-disaster imagery. During runtime, the following process is implemented: 1) the roof localization is performed for pre- and post-imagery of the region of interest, 2) the images are aligned based on georeferencing and alignment of the intact structures and other salient visual features, 3) the percent reduction in area of the bounding box (or other geometric object) is calculated for each property, and 4) the percent reduction is assigned as the damage measure to the property located at those spatial coordinates by comparison to parcel data.

As noted, the use of polygonal markers to represent objects and structures appearing in a scene is useful not only to simplify damage determination, but also to facilitate image alignment. By aligning markers (e.g., polygonal outlines), the computational complexity of aligning two images is reduced (since only a small number of objects need to be matched). Moreover, here too the use of polygonal representation normalizes variations in the level of detail available from images taken by different devices, and at different viewing conditions. In some embodiments, the use of polygonal representation for alignment purposes can supplement (or be supplemented) with other alignment information, to thus achieve a higher degree of alignment accuracy.

Thus, in some variations, a method for detecting damage in a geographical area is provided that includes receiving a first image of the geographical area, captured after occurrence of a damage-causing event in the geographical area, and obtaining a second image of the geographical area, the second image including image data of the geographical area prior to the occurrence of the damage-causing event in the geographical area, with the first image and the second image containing an overlapping portion comprising one or more common objects. The method also includes obtaining markers for the first image and for the second image, with the markers being geometrical shapes corresponding to objects in the first image and in the second image, and determining damage suffered by an object, from the one or more common objects, based on differences between a first geometrical shape corresponding to the object appearing in the first image and a second geometrical shape corresponding to the object appearing in the second image. The second image may have been captured by a light-capture device (e.g., a camera) that is different or the same as the light-capture device that captured the first image (i.e., the post-damage-causing event image). In some embodiments, the second image may alternatively be, for example, a digital surface model image (DSM), obtained from a third-party, with image data representative of the features of the geographical area prior to the occurrence of the damage-causing event. The second image may be derived or generated from earlier images (which may not necessarily be overhead images) of the geographical area, from maps, radar data, and other sources of information. Other types of image representations of the geographical area may also be obtained and used for the analysis/processing described herein.

Embodiments of the method may include at least some of the features described in the present disclosure, including one or more of the following features.

Obtaining the markers for the first image and for the second image may include deriving outlines for at least the one or more common objects appearing in the first image and the second image.

Deriving the outlines for the at least the one or more common objects may include deriving the outlines based on one or more of, for example, a learning model to determine the outlines for the at least the one or more common objects, and/or filtering-based processing to determine the outlines for the at least the one or more common objects.

Determining the damage suffered by the object may include determining the damage suffered by the object based on a learning model to determine damage, the learning model to determine the damage being independent of the learning model to determine the outlines for the at least the one or more common objects.

The learning model to determine the outlines and the learning model to determine damage may be implemented using one or more neural networks learning engines.

Determining the damage suffered by the object may include computing one or more of, for example, difference in a first area enclosed by a first outline of the object in the first image and a second area enclosed by a second outline of the object in the second image, and/or differences between properties of a first set of line segments of the first outline of the object in the first image and properties of a second set of line segments of the second outline of the object in the second image.

The method may further include aligning the first image and the second image according to one or more of, for example, a) a first alignment procedure including aligning the first image and the second image according to georeferencing information associated with the first image and the second image, b) a second alignment procedure including deriving outlines for the at least the one or more common objects in the first image and in the second image, and aligning at least some of the outlines in the first image with respective at least some of the outlines in the second image, and/or c) a third alignment procedure including aligning the first image and the second image based on image perspective information associated with the first image and the second image, the image perspective information determined according to measurement data from one or more inertial navigation sensors associated with image-capture devices to capture the first image and the second image.

The second alignment procedure may further include excluding at least one of the derived outlines determined to correspond to a respective at least one object, from the one or more common objects in the first image and the second image, that was damaged during the occurrence of the damage-causing event. Aligning the first image and the second image may include aligning the first image and the second image based on a set of outlines, selected from the derived outlines for the at least the one or more common objects, excluding the at least one of the derived outlines.

The image perspective information may include respective nadir angle information for the first image and the second image.

The geometrical shapes may include one or more of, for example, points, lines, circles, and/or polygons.

Obtaining the second image may include selecting the second image from a repository of baseline images for different geographical areas based on information identifying the geographical area associated with the second image.

The first image and the second image of the geographical area may include at least one of, for example, a digital surface model (DSM) image, and/or an aerial photo of the geographical area captured by an image-capture device on one or more of, for example, a satellite vehicle, and/or a low-flying aerial vehicle.

In some variations, a system is provided that includes a communication interface to receive a first image of a geographical area, the first image captured after occurrence of a damage-causing event in the geographical area, with the received first image and a second image, obtained prior to the occurrence of a damage-causing event in the geographical area, containing an overlapping portion of the geographical area comprising one or more common objects, and a controller, coupled to the communication interface. The controller is configured to obtain markers for the first image and for the second image, with the markers being geometrical shapes corresponding to objects in the first image and in the second image, and determine damage suffered by an object, from the one or more common objects, based on differences between a first geometrical shape corresponding to the object appearing in the first image and a second geometrical shape corresponding to the object appearing in the second image.

In some variations, a non-transitory computer readable media is provided, storing a set of instructions executable on at least one programmable device, to receive a first image of the geographical area, captured after occurrence of a damage-causing event in the geographical area, obtain a second image of the geographical area, the second image including image data of the geographical area prior to the occurrence of the damage-causing event in the geographical area, with the first image and the second image containing an overlapping portion comprising one or more common objects, obtain markers for the first image and for the second image, with the markers being geometrical shapes corresponding to objects in the first image and in second image, and determine damage suffered by an object, from the one or more common objects, appearing in the first image and in the second image based on differences between a first geometrical shape corresponding to the object appearing in the first image and a second geometrical shape corresponding to the object appearing in the second image.

In some variations, an additional method, for image alignment, is provided that includes receiving a first image of a geographical area, and obtaining a second image of the geographical area, the second image including image data of the geographical area prior to capture of the first image, with the first image and the second image containing an overlapping portion comprising one or more common objects. The additional method further includes obtaining markers for the first image and for the second image, with the markers being geometrical shapes corresponding to objects in the first image and in the second image, and aligning the first image and the second image based on the obtained markers for the first image and the second image.

Embodiments of the additional method may include at least some of the features described in the present disclosure, including at least some of the features described above in relation to the damage detection method, system, and media, and also including one or more of the following features.

Obtaining the markers for the first image and for the second image may include deriving outlines for at least the one or more common objects appearing in the first image and in the second image.

Deriving the outlines for the at least one or more common objects may include deriving the outlines based on one or more of, for example, a learning model to determine the outlines for the at least the one or more common objects, and/or filtering-based processing to determine the outlines for the at least the one or more common objects.

Aligning the first image and the second image may include aligning at least some of the outlines in the first image with respective at least some of the outlines in the second image.

The first image may be captured after occurrence of a damage-causing event in the geographical area, and the second image may be captured prior to the occurrence of the damage-causing event in the geographical area.

Aligning the first image and the second image may include excluding at least one of the derived outlines determined to correspond to a respective at least one object, from the one or more common objects in the first image and the second image, that was damaged during the occurrence of the damage-causing event. Aligning the first image and the second image may include aligning the first image and the second image based on a set of outlines, selected from the derived outlines for the at least the one or more common objects, excluding the at least one of the derived outlines.

Aligning the first image and the second image may further include aligning the first image and the second image further according to one or more of, for example, i) a second alignment procedure including aligning the second image with the first image according to geo-referencing information associated with the first image and the second image, and/or ii) a third alignment procedure including aligning the first image and the second image based on image perspective information associated with the first and second images, the image perspective information determined according to measurement data from one or more inertial navigation sensors associated with image-capture devices to capture the first image and the second image.

The image perspective information may include respective nadir angle information for the first image and the second image.

The geometrical shapes may include one or more of, for example, points, lines, circles, and/or polygons.

Obtaining the second image may include selecting the second image from a repository of baseline images for different geographical areas based on information identifying the geographical area associated with the second image.

The first image and the second image of the geographical area may include at least one of, for example, a digital surface model (DSM) image, and/or an aerial photo of the geographical area captured by image capture device on one or more of, for example, a satellite vehicle, and/or a low-flying aerial vehicle.

In some variations, an additional system is provided that includes a communication interface to receive a first image of a geographical area, with the received first image and a second image of the geographical area, including image data of the geographical area prior to capture of the first image, containing an overlapping portion of the geographical area comprising one or more common objects, and a controller coupled to the communication interface. The controller is configured to obtain markers for the first image and for the second image, with the markers being geometrical shapes corresponding to objects in the first image and in the second image, and align the first image and the second image based on the obtained markers for the first image and the second image.

In some variations, additional non-transitory computer readable media is provided, storing a set of instructions executable on at least one programmable device, to receive a first image of the geographical area, obtain a second image of the geographical area, the second image including image data of the geographical area prior to capture of the first image, with the first image and the second image containing an overlapping portion comprising one or more common objects, obtain markers for the first image and in the second image, with the markers being geometrical shapes corresponding to objects in the first image and in the second image, and align the first image and the second image based on the obtained markers for the first image and the second image.

Embodiments of the systems and non-transitory computer readable media may include at least some of the features described in the present disclosure, including at least some of the features described above in relation to the methods.

Advantages of the embodiments described herein include normalizing representations of image features so that such features can more easily be compared. Small deviations in dimensions and shapes of structures, that can be attributable to noise or to variations in image quality between the pre- and post-images, can thus be muted. The use of representations (polygonal or some other geometric configuration) for features appearing in images also provides for a convenient and straightforward way to detect changes to objects/features based on reduction in the area enclosed by the representations, based on changes to the properties of line segments comprising the representations, and so on. Another advantage of the use of markers/representations as approximations of features in the image is that it provides a straightforward and computationally economical way of aligning images by only needing to process a discrete number of features/objects to perform the alignment. The number of features that need to be considered during the alignment can be further reduced by excluding features that potentially may have been damaged (as may preliminarily be determined in pre-alignment processing) in a damage-causing event, and would thus skew the alignment results if those potentially damaged features were included in the alignment procedure.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
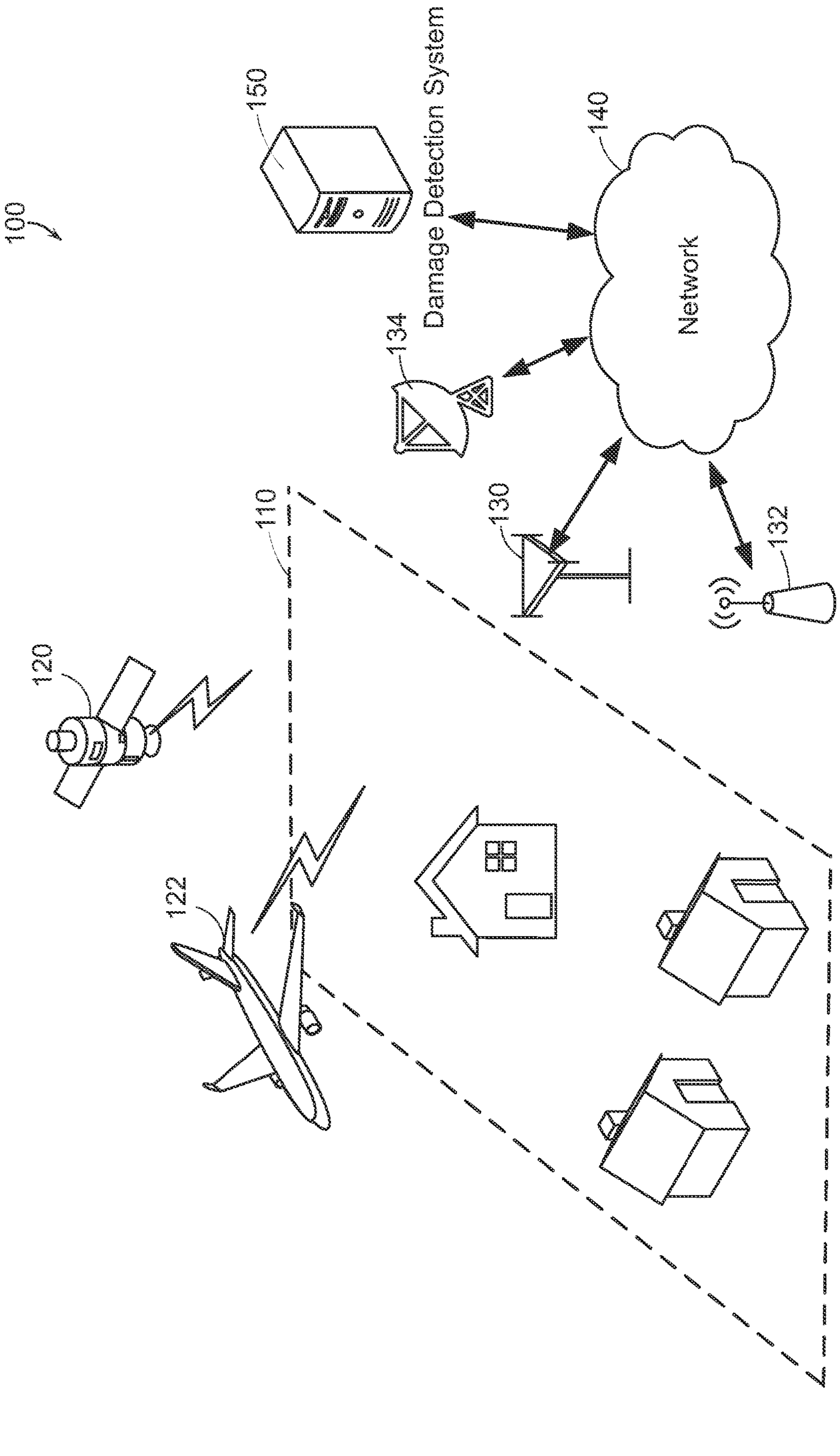
FIG. 1 is a diagram of an example system to detect damage in a geographical area.

FIG. 1 is a diagram of an example system 100 to detect damage in a geographical area 110 according to deviations between outlines determined for pre- and post-imagery taken for a geographical area that has been affected by a damage-causing event. The outlines, which can be generated based on a learning model implemented on a learning machine or using filter-based processing (e.g., an algorithmic processing approach), can be relatively simple geometric shapes (e.g., bounding boxes, circles, or rectangles), or more complex shapes (complex polygons) that provide a more accurate approximations of the structures they represent, but still allow for a more simplified analysis of structural changes that may have occurred to structures/objects as a result of some damage causing event (e.g., a natural disaster like an earthquake, a powerful storm, fire, flooding, etc.) The outline-generating process can be executed independently from the process that analyzes the resultant outline output data to detect potential damage to one or more objects appearing in a current image, thus increasing reliability and confidence levels in the computed results (e.g., estimates of damage).

As shown in FIG. 1, the system 100 includes one or more platforms, such as a satellite vehicle 120, and an aerial vehicle 122, which in the example of FIG. 1 is an airplane. Other types of vehicles (e.g., balloons, unmanned autonomous vehicles (UAV) such as a multi-rotor aircraft) may also be used. Generally, each of the aerial platforms is equipped with image-capture devices (not shown), that may be configured to capture and record signals inside, and optionally outside, the visible range (e.g., in the infrared range, near infrared range, short wave infrared range, and other bands on the electromagnetic spectrum). Examples of image-capture devices (e.g., to capture light in the visible range) include a charge-coupled device (CCD)-based capture unit, a CMOS-based image sensor, etc., which may produce still or moving images. An image capture device may also include optical components (e.g., lenses, polarizers, etc.) to optically filter/process captured light data reflected from physical objects, before the optically filtered data is captured by a capture unit of an image capture device. In some embodiments, an image-capture device may be locally coupled to processing/computing devices that are configured to implement initial processing on captured image data, such as, for example, perform calibration operations, compress or arrange raw image/video data (provided to it by the capture unit) into a suitable digital format such as a Tagged Image file (TIF) formatted images, JPEG images, or any other type of still image format, or digital video format (such as MPEG).

The platforms 120 and 122 may also be equipped with navigation sensors to measure information such as camera position data for the acquiring camera (e.g., expressed as geo-referencing data), camera attitude data (including roll, pitch, and heading), etc. The camera attitude data can be used, in some implementations, to normalize the corresponding image data to produce, for example, nadir view normalized images, providing a top-view of the scene, that eliminates or reduces any perspective/angle views in the image. Based on the navigation sensor measurements, geometry correction for acquired image data can be performed to rotate, or otherwise manipulate the image's pixels according to formulations that can be derived based on the navigation sensor data. For example, the relative perspective of each of camera can be used to derive a transformation that is applied to the image data to yield a resultant image corresponding to a top-view of the scene. As will be described in greater detail below, this perspective information may be used in conjunction with outline data generated for a pre- and post-imagery of a geographical area to facilitate an image alignment procedure (also referred to as an image registration procedure).

Captured image data may be written to a memory/storage device in communication with the capture unit, and/or may be transmitted to ground station communication nodes, which in FIG. 1 are depicted as a WWAN base station 130, an WLAN access point 132 (either of the nodes 130 and 132 may be configured to establish communication links to the aerial vehicle 122), and a satellite communication node 134 configured to transmit and/or receive signals to and from satellite vehicles 120. From there, image and sensor data is communicated to the damage detection system 150 via a network 140 (which may be a packet-based network, such as the public Internet), or via wireless transceivers (not shown) included with the damage detection system 150. The platform acquiring the image and sensor data may also transmit positioning information, which may include their relative positions, and/or absolute positions (provided, for example, as accompanying geo-reference data of the camera and/or sensor). The transmissions to the damage detection system 150 may also include timing information.

Upon receiving the data (e.g., visible range image data, as well as, in some embodiments, geospatial data in other EM bands, positioning information, metadata, etc.), the damage detection system 150 detects damage to at least one object appearing in the image constructed from the received data (typically, the constructed image would include data representative of visible range captured data). The system 150 includes an outline processing engine (also referred to as a marker generator) to generate outline data to represent ground structures or objects as geometric-shaped approximations, and a damage detector (e.g., implemented as a learning model to detect damage, or as a filtering-based process applied to the data) that detects damage to one or more objects appearing in the image data based on the resultant outline data generated by the outline processing engine. The derived outline data can then be processed on a separate, independent, learning engine to detect potential damage. For example, a learning machine can identify unusual features in the outlines produced by the outline processing engine (e.g., unusual angles, unusual or unexpected discontinuities in the contours, etc.) that may be indicative of the occurrence of damage. Determination of the existence of damage may be aided by external information (weather reports, damage-index data, and so on) that indicate that the geographical area, corresponding to the image data from which the outline data was derived, was impacted by a damage-causing event, thus increasing confidence associated with a determination of damage for an object whose analyzed outline suggests the object/structure sustained damage.

Alternatively, and as will be discussed in greater detail below, the outline data produced by the outline processing engine can be compared to baseline data (e.g., outlines produced from a baseline image for the particular geographical area for which image data was obtained). A comparison engine can be one based on a filtering approach (e.g., an algorithmic approach to compare derived outlines/contours for objects detected in an image), and/or based on a learning model approach that accepts as input current outline data and baseline outline data, and outputs data representative of the extent of deviation between outlines of corresponding objects, and/or damage data representative of possible damage (and/or a quantification or assessment of such damage) that the deviation between corresponding outlines (current versus baseline) suggests exists. In some examples, outlines generated for a current image can also be used to align the current image with the respective baseline image based on the outlines for objects/features identifiable in the baseline image. Because at least a portion of the current image corresponds to a portion of an appropriate baseline image, by matching up the outlines of objects in the common portions of the current and baseline images, alignment parameters (transformation parameters) can be determined (e.g., via an optimization process) to map the current and baseline images to a common frame of reference.

Figure 2:
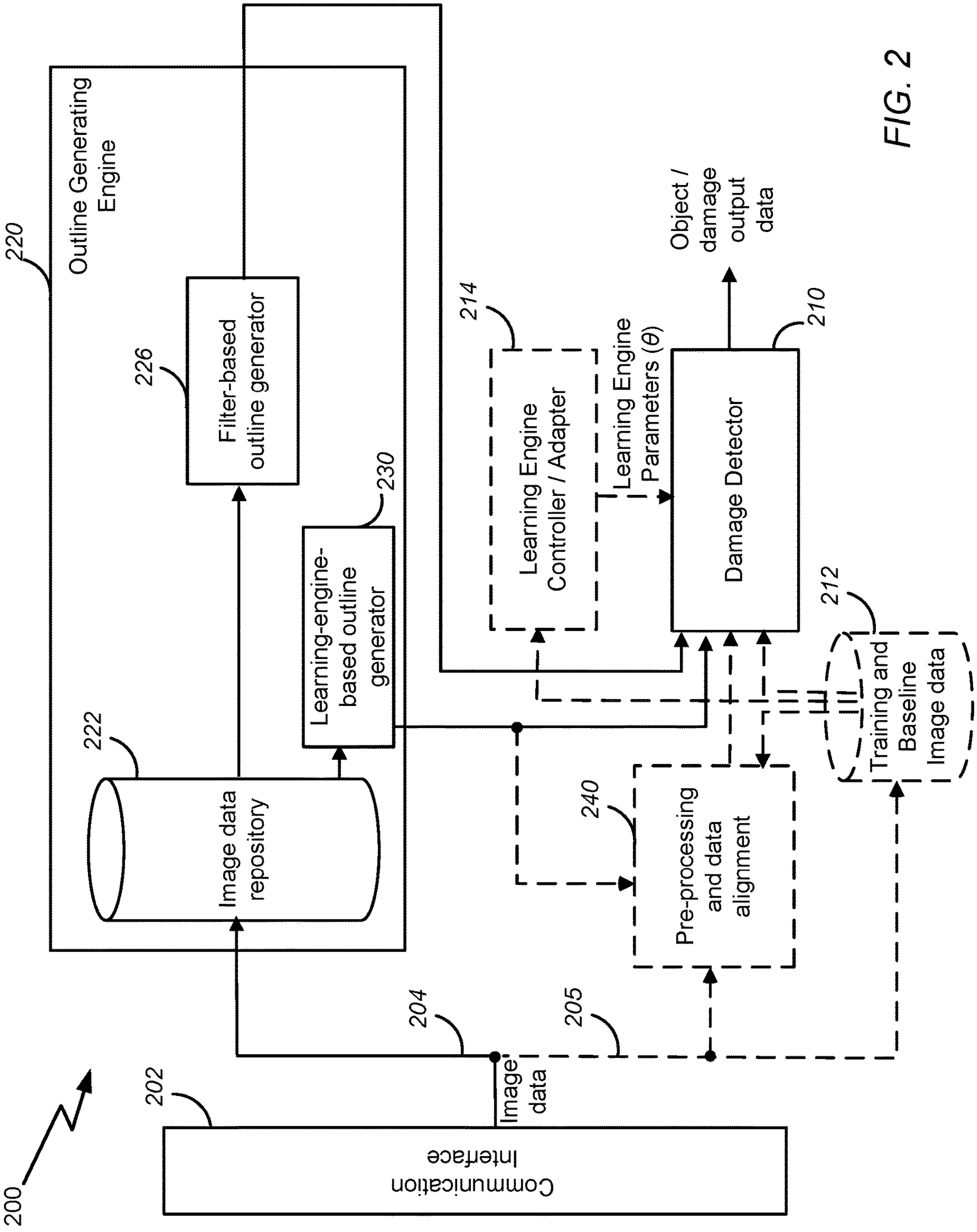
FIG. 2 is a block diagram of an example damage detection system.

More particularly, and with reference now to FIG. 2, a block diagram of an example damage detection system 200, which may be similar to the system 150 of FIG. 1, is shown. The system 200 includes a damage detector 210 (which may be implemented using a learning engine realized, for example, using neural networks or other types of learning machines, or implemented as an image processing/filtering engine) to identify objects in an image, label or mark such identified objects with geometric shapes indicative of the outlines/contour of the objects, and/or determine damage to one or more of such identified objects (and/or determine damage estimate). In some implementations, the determination of the existence of damage may also be based on a differential model to determine whether there has been deviation in the dimensions/shapes of detected objects or structures in a current image from what was detected in earlier baseline images. In such embodiments, the damage detector 210 may be trained using grounds truths stored in a baseline image repository 212. The use of a differential model generally requires additional processing to be performed on the baseline images used during training, or later during runtime operations. Such processing may include image alignment, segmenting, or processing the baseline image to generate compact data representative of the content and/or classification of the data. For example, baseline images are generally associated with positioning information identifying the particular geographical areas for which the baseline images. The specific baseline image to be compared to the current image received at the system can thus be selected based on positioning information associated with the current image. The baseline images may include an overhead image of the particular geographical area being analyzed that was captured by the same or different light-capture device that captured the current image, or may include an image representation generated based on some other type of information. Such a baseline image representation may include a digital surface model (DSM) image generated from data sources representative of features of the geographical area (e.g., using one or more ground photos, possibly supplemented with other data representative of the physical features of the geographical area, such as radar data, topographical data, etc.)

As illustrated in FIG. 2, a communication interface 202 receives as input the image data, e.g., visible range data acquired using a light-capture device mounted on one of the overhead platforms of FIG. 1 (in some implementation, the image data may also include infrared image data, image data in other bands, and metadata that includes, for example, positioning information). The data thus received at the communication interface 202 is generally directed along a path via, for example an electrical link 204, to the outline processing engine 220 that is configured to detect/identify features in the image data and label those features (objects) using outlines representing the features/objects discernable in the image. Optionally, received image data corresponding to baseline data that does not need to be immediately processed can be stored in a repository 212 (coupled to the communication interface 202 via the link 205). The image data can be optionally stored in an image data repository, and from there provided to the learning-engine-based outline generator 230 that implements a trained learning model for detecting objects/features in the input image, and outputting in response output comprising polygonal structures representative of the objects or structure that the learning-engine-based outline generator 230 is trained to detect. The learning engine 230 is generally trained independently from other learning engines used in the system 200 (such as the damage detector 210 when the latter is implemented as a learning engine) using training data that includes sample images and ground truths that define structures detectable in the image and/or geometrical shapes with which to represent the detectable structures or objects in the scene.

Alternatively or additionally, in some embodiments, the detection of objects/features (for which a determination of the existence of damage is to be made) may be implemented using a filter-based approach, in which the input image to be analyzed is provided to the filter-based outline generator 226 configured to apply image processing filtering, e.g., to detect shapes and objects in the image through, for example, feature detection filtering (to detect edges, corners, blobs, etc.), morphological filtering, etc., and generate respective outlines or geometric shapes representative of the structures/objects detected in the scene (captured by the input image). Such generated outlines can be superimposed on the input image to thus provide an output image that includes both the actual image data and the geometric shapes generated for the detected structures or objects in the scene. Alternatively, the output image can include only the resultant shapes or outlines, arranged in a manner that maintains the relative positioning and orientation of the structures/objects in the original image relative to each other. Complex irregular polygonal shapes (to overlay or replace the actual raw data) can be derived for features appearing in the image based on optimization processes, for example, an optimization process that fits the best closed polygon to a detected object, subject to certain constraints (e.g., minimal line length for each segment of the polygon, minimal area enclosed by the polygon, etc.)

Figure 3:
FIG. 3 includes a source image and a resultant image with generated outlines for the objects appearing in the source image.

For example, and with reference to FIG. 3, a processed image 302 of an input image 300 captured by an overhead platform is shown, in which several structures are detected (either by filter-based approach implemented by the unit 226 of FIG. 2, or by the learning-engine-based approach implemented by the unit 230 of FIG. 2). Specifically, the image 302 includes detected structures/objects 310, 320, and 330 (in this example, the identifiable structures are roofs), which are respectively associated with resultant outlines 312, 322, and 332 that, in this example embodiment, are superimposed on the source image. As can be seen, the outline-generating implementation that produces the outlines illustrated in FIG. 3 are configured to identify the boundaries of the roof that define the dimensions of the structures and separate them from background and foreground information not belonging to the roof structures. In some examples, the outline-generating procedures may also be configured to produce marks (e.g., in the form of outlines) for individual distinguishable regions within the detected roof structures 310, 320, and 330 (e.g., for the various different angled/tilted sections, chimney, vents, and other objects disposed on the various roof structures). In the particular example of FIG. 3, no separate segmentation of the broader outlines of the detectable structures (roofs) into smaller sub-regions is performed. The structure detection and outline-generating procedure(s) implemented by the outline processing engine 220 may be configured to adjustably control various performance parameters for generating outlines. For example, the thickness and resolution of the outlines generated can be controlled to produce coarse, but simpler, boundary lines that approximate, but do not necessarily exactly overlap, the contours of the detected structures. Alternatively, the outline processing engine 220 can be configured so that the outline-generating procedures output more refined (and thus more complex) outlines that trace more closely the boundaries of the structures.

In some examples, other markers (geometrical shapes, such as circles or dots, letters, etc.) may be used, by the learning engine 230 and/or the filter-based outline generator 226, to mark/label images to produce resultant images. In some embodiments, both the filter-based engine 226 and the learning-engine-based outline generator 230 may be applied to the input image to independently generate resultant output with data representative of objects and their respective outlines. The independently generated outputs can be compared to determine if the separate results are in agreement with each other, which can inform a confidence level associated with the outputs. In situations where there is a discrepancy between the results obtained by either of the outline-generating procedures, a threshold level may be used to determine if the discrepancy is high enough that the outputs produced by the respective procedures should not be used (or alternatively, that a weighted composite output, or that only one of the multiple outputs, should be used).

As further depicted in FIG. 2, in embodiments in which the independent outline processing engine 220 detects structures (e.g., insurable structures for which potential damage resulting from a damage-causing event needs to be assessed) and generates outlines therefor, the output data is provided to the damage detector 210 configured to determine the existence and extent of damage for the structures identified and outlines by the outline processing engine 220. Alternatively, in some embodiments, the damage detector may be configured to perform both the outline generation processing (i.e., instead of having the outline generating engine 220 determine the outlines) and the damage detection.

Two example approaches are described herein for implementing the damage detector 210. In a first example approach, the damage detector 210 is implemented as a learning engine configured to detect, based on input data that includes outline data for structures/objects appearing in an image of a geographical image, but without reference to baseline data, damage (if any) sustained by the structures detected in the image data. In a second approach, a differential approach, in which current outline data (whether generated by a separate, independent learning engine, such as the engine 220, or determined by the damage detector 210) is compared to baseline data to determine deviations of the generated outlines for the structures/objects detected in the input image, from outlines generated for earlier, baseline images for the same geographical area for which the current image data is processed.

In the first approach, the damage detector 210 (whether operating on image data, on outlines data, or on both) is trained to identify abnormal outlines and other type of anomalies in the outlines being analyzed and processed by the damage detector 210. Example of abnormal/anomalous outlines include discontinuities and gaps between different neighboring polygonal segment, warped line configurations (i.e., unusual geometries that are consistent with outlines of damaged structures), irregular line patterns (e.g., aperiodic jagged lines patterns with perturbations that do not follow a symmetrical or consistent pattern), etc. During training for this approach, training data (labelled automatically by an independent processing machine, or labelled by human operators) can provide to the damage detector 210 (or more particularly, to a learning engine controller/adapter 214) data containing examples of outlines (e.g., polygons) for damaged and undamaged structures, and their respective ground truths (e.g., their classifications as being damaged or undamaged structures, as labelled by a human operator). In some embodiments, the training data used to train the damage detector 210 may include example data (images and/or outlines of structures in the images) for objects damaged from different damage-causing events (e.g., fire, flood, earthquakes, etc.), and at different geographical areas.

In the second, differential approach, detection (and/or assessment) of damage is based on a comparison of the current outline data to an earlier baseline data that includes data representative of outlines/contours (superimposed on the source image data, or separated from the source image data) of identifiable structures, in a geographical area, at their pre-damage state. Such baseline outline data may have been derived at some earlier point using, for example, outline-generating processing similar to that implemented by the outline generating engine 220. The baseline data (e.g., baseline outlines data, with or without the source images, for different geographical areas) may be stored in the repository 212 that is coupled to the damage detector 210. To implement detection and/or assessment of damage based on a differential model that determines deviation in the structural dimensions and shapes of identified objects in an earlier baseline data (as can be determined from their derived outlines), the damage detector 210 may be trained using grounds truths determined for damaged and undamaged structures visible in images. The labelling process (to determine ground truth) can be aided, in some embodiments, by image processing and analysis tools that independently compute deviations in dimensions between the pre- and post-damage occurring events for structures identifiable in image data.

As further depicted in FIG. 2, in embodiments in which the damage detector 210 is a learning-engine based implementation, the system 200 further includes the learning engine controller/adapter 214 configured to determine and/or adapt the parameters (e.g., neural network weights) of the learning engine that would produce output representative of detected objects and/or detected damage determined from the polygonal representations determined for the source image data (e.g., overhead images obtained from an overhead satellite or an airplane, as illustrated in FIG. 1). To train the damage detector 210, training data comprising polygonal representations of objects/structures (damaged and undamaged) in different geographical areas (and, if a differential approach is being implemented, at different times) is provided to the controller/adapter 214. The training data also includes label data representative of the classifications of such objects/structures as being damaged or undamaged (and possibly include other information, such as a quantification of the extent of damage). The polygonal representation data, label data, and other information included with the training data thus define a sample of the ground truth that is used to train the damage detector 210 of the system 200 (offline and/or during runtime). This training data is used to define the parameter values (weights, represented as the vector $\theta$) assigned to links of, for example, a neural network implementation of the learning engine. The weight values may be determined, for example, according to a procedure minimizing a loss metric between predictions made by the neural network and labeled instances of the data (e.g., using a stochastic gradient descent procedure to minimize the loss metric). The computed parameter values can then be stored at a memory storage device (not shown) coupled to the damage detector 210 and/or to the controller/adapter 214. After a learning-engine based implementation of the damage detector 210 has become operational (following the training stage) and can process actual runtime data, subsequent runtime training may be intermittently performed (at regular or irregular periods) to dynamically adapt the detector 210 to new, more recent training data samples in order to maintain or even improve the performance of the detector 210. When training the damage detector 210 according to the differential approach, the baseline image repository 212 is optionally coupled to the learning engine controller/adapter 214. In some embodiments, additional processing may be required to be performed on the baseline images used for training (e.g., aligning, segmenting, or feeding a baseline image to some other model to generate compact data representative of the content of the data and classification thereof).

Optionally, as also illustrated in FIG. 2, where the system 200 implements a differential damage detection approach, outline data generated by the outline generating engine 220 (or optionally image data provided directly from the communication interface 202) may need to undergo pre-processing, prior to being provided to the damage detector 210, by a pre-processing and data alignment unit 240 to, for example, align the incoming image with the baseline image that will be used to determine if there has been any damage sustained by any object appearing in the incoming data.

If an aligning process is required (in situations involving a differential damage detection approach), incoming data and the corresponding baseline data can be aligned according to one or more alignment procedures. For example, in some embodiments, the alignment may be based on information provided by inertial navigation sensor measurements of the platforms that acquired the images. Such information may include, for example, camera position data for the acquiring camera, camera attitude data (including roll, pitch, and heading), etc. That inertial navigation information can also be used to normalize the corresponding image data to produce, for example, nadir view normalized images, providing a top-view of the scene, that eliminates or reduces any perspective/angle views in the image. Based on the inertial sensor measurements, geometry correction for the various images can be performed to rotate, or otherwise manipulate the image's pixels according to formulations that can be derived based on the inertial sensor measurement data. For example, the relative perspective of each of camera (mounted on one of the aerial or satellite vehicles) can be used to derive a transformation that is applied to the image data to yield a resultant image corresponding to a top-view of the scene. In addition to normalizing each of the images to a nadir view normalized image, at least one of a pair of images generally needs to be aligned with the other image (so that a baseline image and a current image correspond to the same frame of reference). Here too, inertial navigation sensor measurements by respective sensors of two platforms that acquired the two images to be aligned, may be used to compute the relative perspective of one (or both) acquiring image-capture device(s) in order to derive transformation parameters to register the pair of images to a common frame of reference (which may the frame of reference used by one of the pair of images, or some other frame of reference). This relative perspective information can, in turn, be used to derive a transformation matrix to be applied the image that is to be aligned.

Although this alignment approach in which aerial and satellite imagery, georeferenced with latitude and longitude coordinates to allow merging with other data sources such as additional imagery, maps, and parcel data, is effective in many situations, significantly off-nadir imagery has a complex drift in georeferencing across the image due to the interaction of the oblique angle with the topography of the landscape. This can prevent accurate alignment with other data sources, especially in dense, urban landscapes where disambiguation of adjacent buildings is paramount. Thus, in such situations, a combined approach using mathematical transforms can be implemented that is based on the sensor data and elevation, in conjunction with alignment based on localizations of specific properties and similar features for significantly off-nadir imagery of urban landscapes. Such a combined approach could solve the problem of disambiguation of specific properties in dense neighborhoods and developments. In particular, undamaged structures could work as alignment markers between images acquired at different times. The combined alignment approach includes performing an affine transformation to correct for perspective and elevation, performing a localization of properties and other features in target imagery and in set of reference imagery, and remapping of imagery onto consistent, georeferenced coordinates based on alignment with reference imagery.

Accordingly, in some embodiments, alignment of the two images may be performed according to outlines generated for source images (e.g., the baseline images or the current images). In such embodiments, a current image is processed by, for example, the outline generating engine, to generate outline representations for detectable objects in a scene (e.g., roofs of houses). The generated outlines that are to be used for aligning the image do not necessarily need to match the outline representations generated for damage detection, although they may, especially if the outline generating engine (such as the engine 220) is to be used to generate outlines for both damage detection and estimation (where an accurate polygonal approximation is needed) and for image alignment. Alternatively, a separate image segmenter, configured for coarse generation of geometric shapes (rectangles, more complex polygons, or other shapes) may be used to generate multiple geometric shapes that are to be matched to corresponding shapes in the baseline image with which the current image is to be aligned. The resultant outline for segmented baseline image may be generated at runtime (i.e., at substantially the same time that the current source image is segmented), or the outlines may have been generated at an earlier time and stored in the baseline image repository 212. As noted, generation of outline may be performed through a learning engine (e.g., a neural network) configured to identify and/or mark (label) features and objects appearing in an image. Alternatively, another possible methodology that may be used, is to apply filtering to the image (e.g., edge detection filtering, morphological filtering, etc.) in order to detect various features, such as edges, corners, blobs, etc. The shapes and relative dimensions of the resultant artefacts can then be used to determine the likely objects corresponding to the resultant features.

In some examples, prior to performing the alignment procedure (e.g., according to an optimization process that seeks to determine transformation parameters resulting in minimization of the error defined for the differences between orientations, positions, and dimensions of the polygons to be matched in two input image), the alignment module may be configured to first detect possible damaged structures in the images, and eliminate those structures from the aligning procedure (since optimizing transformation parameters using features that do not perfectly match due to damage suffered in the current image can increase the degree of alignment error). In such examples, determination of possible damaged structures, appearing in an image, to be excluded from the alignment procedure may be performed through a learning model implementation (which may be different and independent from the learning models implemented by the engines 210 and/or 220 depicted in FIG. 2), or based on some filtering or algorithmic process (e.g., according to rules defining criteria for excluding or including a particular polygon within the alignment process).

Figure 4:
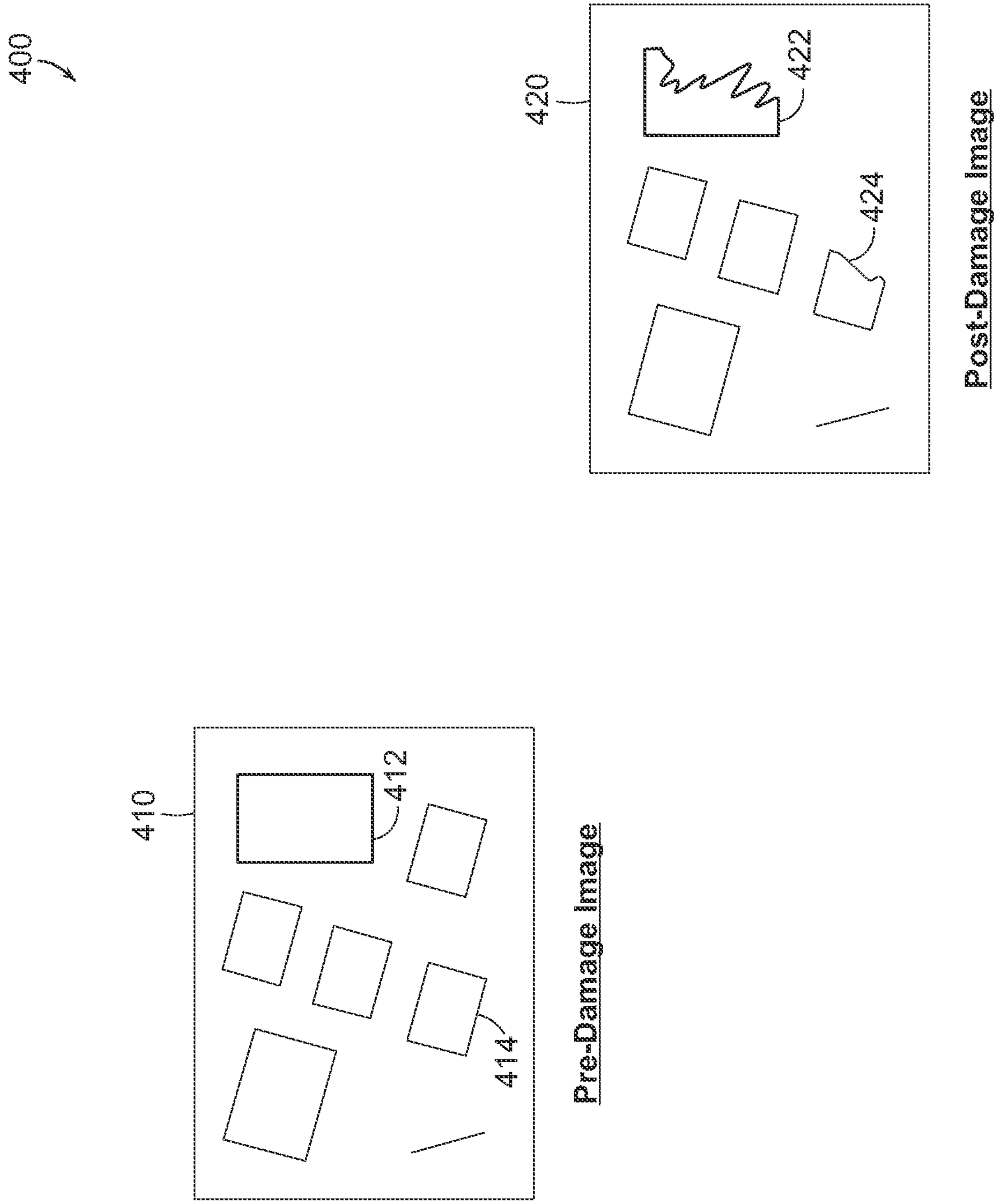
FIG. 4 is an example illustration of outline representations for objects in a pre-image and a post-image that are used in a process to determine damage occurring to identifiable structures.

For example, consider FIG. 4, showing an example illustration 400 of polygonal representations of structures, that includes a polygonal representation diagram 410 of structures as they appeared prior to the occurrence of a damage-causing event, and a polygonal representation diagram structure 420 of the structures (corresponding to the structures in the diagram 410) as they appear following the occurrence of the damage-causing event (a fire, an earthquake, a storm, an accident, etc.) The two diagrams 410 and 420 both correspond to the same geographical location, and show that the structure represented by the polygon 422 (corresponding to the structure 412 in the diagram 410) has suffered significant damage, and that the structure 424 (corresponding to the structure 414 in the diagram 410) has also suffered damage, although possibly to a lesser extent than the structure represented by the polygon 422. Specifically, it can be seen that one side of the polygon 422 includes a highly irregular jagged pattern. Since using the polygon 422 for alignment purposes is likely to skew the alignment optimization process, the pre-processing and data alignment unit 240 of FIG. 2 may be implemented to exclude the polygons 422 and 412 from the alignment procedure. This determination can be made based, for example, on rules that cause exclusion of a polygon if the angles between a threshold number of intersecting line pairs is below some threshold angle value (e.g., 15°). In the example of FIG. 4, there are several line-pairs that define angles smaller than 15°, and the implementation of the above rule would therefore cause the damaged polygon, and its counterpart from the pre-damage event polygonal representation 412, to be excluded from the alignment procedure.

With the outlines of the current image and baseline image that are to be matched thus obtained (with the outlines of some of the structures excluded due to damage that is too severe and would skew the alignment), the alignment procedure next determines transformation and/or rotation parameters that achieve an optimal alignment of the baseline and current image (e.g., according to minimization of some error function). For example, the two images (e.g., the current image and the baseline image) are aligned by, for example, rotating one image so that the marked features in one image (e.g., the current image) most optimally match the marked features in the other image (e.g., the baseline image). Because generally the marked features in one image will not be identical (in size or orientation, or even shape) to the other image (e.g., because of damage sustained to one or more of the structures identified in the current image), aligning based on identified/labelled features usually involves some optimization process (e.g., to minimize an error function or cost function relating to the matching of features from one image to the features of the other image). The optimization procedure to match the marked features can thus yield the parameters of a transformation matrix (rotation, translation, and/or magnification) to apply to the images being aligned so that the two images share a common frame of reference.

The above approach based on alignment of polygons in a pre- and post-damage-causing event images (whether implemented on its own or in combination with alignment based on georeferencing and sensor data obtained for captured imagery) can achieve more accurate localization that would allow, as a result, to: 1) integrate pre- and post-disaster imagery into a unified model for more accurate evaluation of damage, 2) reliably center the image fed into the model on the individual property of interest, integrate structure data with parcel datasets to report the address, ownership, and similar information for a specific property, and/or 3) expand available training data by transferring labels from one set of imagery for a specific area to another set of imagery for the same area. The polygon aligning process can also be used to implement the monitoring and predicting/simulating disaster evolution in real-time by integrating a sequence of imagery for the same area.

Turning back to FIG. 2 and the damage detection and estimation processes implemented thereby, with the current image and the corresponding baseline image (the latter being selected from the repository 212 according, for example, to geographical information or metadata associated with the images) now aligned, the polygonal representations of the two images (with the original content kept or removed) are provided to the detection engine 210 trained to detect differences, or deviations between, for examples, the outlines/contours of objects in a current image and the outlines/contours of respective objects in the baseline image. In embodiments in which the detection engine implements a learned differential model, the engine 210 can determine whether deviations between respective polygons are attributable to noise or represent damage suffered by a structure as a result of a damage-causing event. In such embodiments, the engine 210 will have been previously trained, according to pairs of baseline and corresponding subsequent images defining ground truth for damage detection and estimation, to determine the damage and/or extent of damage suffered by one or more identifiable structures appearing in a current image.

In some embodiments, determination of the existence and extent of damage may also be based on the image data within the interiors of the outlines being compared. This may be particularly useful when coarse outline representations (e.g., marking structures with simplified geometric representations, such as the rectangular outlines shown in FIG. 4) are used to identify/demarcate the structures to be compared, but those markers may not by themselves provide all the information about potential damage suffered by the structures. In such embodiments, the generated outlines (polygons) may be used for isolating specific portions of the input images so that only those isolated portions need to be processed/analyzed by the damage detector 210. In some situations, the outcome of the processing performed by the learned detection engine 210 may further depend on supplemental data (e.g., damage index data, weather reports, etc.) associated with the images being processed and analyzed.

Alternatively, and as discussed herein, the detection engine 210 may be configured to determine damage to structures appearing in image data, and/or estimate the extent of the damage (e.g., as a percentage of the structure or object in its undamaged condition, or in monetary value terms) based on non-learning models, e.g., based on filtering- and/or algorithmic approaches for comparing the baseline and current image data (whether the data includes only resultant outline data, or also includes at least some of the original raw data captured by image-capture devices). An example of an algorithmic approach that may be applied to detect and/or assess the extent of damage is based on computation of the areas enclosed by the polygons of a current image relative to the areas enclosed by the respective polygons in the baseline image. For example, the number of pixels enclosed by a polygon in the current image may be computed and compared to the number of pixels enclosed by the respective polygon of the baseline image. The current polygon may be determined to have sustained damage if, for example, the number of pixels enclosed by the polygon in the current image deviates by some threshold level (e.g., 5%) from the number of pixels enclosed by the respective polygon in the baseline image. To ensure that there is no systematic scaling error skewing the comparison of the structures in the current image to the structures identified in the baseline image, the damage detector may be configured to confirm that at least some structures of features in the current image have not changes relative to the corresponding structures or features in the baseline image.

In another example, the determination of deviations in the geometry of examined current and baseline structures may be based on comparisons of properties of polygonal line segments (e.g., their angles relative to other connected line segments, their lengths, etc.) This approach could identify potential damage in situations where the dimensions of polygon representing structures may have increased (because of wreckage being scattered over a larger area than originally occupied by the intact structure appearing in the baseline image). Here too, thresholds to define when a structure with a changed geometry can be considered to have been damaged may be used. For example, a structure may be deemed to have been damaged if more than 5% of the line segments defining the structure have properties that are different than the properties of the line segments in the respective baseline structure. In some embodiments, the determination of deviation in the geometry of polygonal representations of structures between the current and baseline images may combine several approaches to produce a weighted result of the existence of damage to a particular structure. For example, the damage detector 210 may be configured to compute deviations in the geometry according to the enclosed area approach and according to the polygonal lines properties approach described above, and to combine the output produced by the two approaches according to some formulation (e.g., each individual output weighed by a factor of 50% or some other weight apportionment). In some examples, the damage detector 210 may also combine the quantitative approach with the learned model approach as a way of corroborating the outcome produced by the different approaches. Other approaches for assessing the occurrence of damage to a structure (algorithmic/filter-based approach or a learned model approach) may also be implemented.

The learning engines used by the damage detection system 200, including the damage detector 210 and/or learning engines used for other operations (e.g., the outline generator 230) may be implemented as neural networks. Such neural networks may be realized using different types of neural network architectures, configuration, and/or implementation approaches. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data. Other examples of learning engine approaches/architectures that may be used include generating an auto-encoder and using a dense layer of the network to correlate with probability for a future event through a support vector machine, constructing a regression or classification neural network model that indicates a specific output from data (based on training reflective of correlation between similar records and the output that is to be identified), etc.

Implementation described herein, including implementations using neural networks, can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes implemented through use of the neural networks may be configured or programmed using TensorFlow (a software library used for machine learning applications such as neural networks). Other programming platforms that can be employed include keras (an open-source neural network library) building blocks, NumPy (an open-source programming library useful for realizing modules to process arrays) building blocks, etc.

Figure 5:
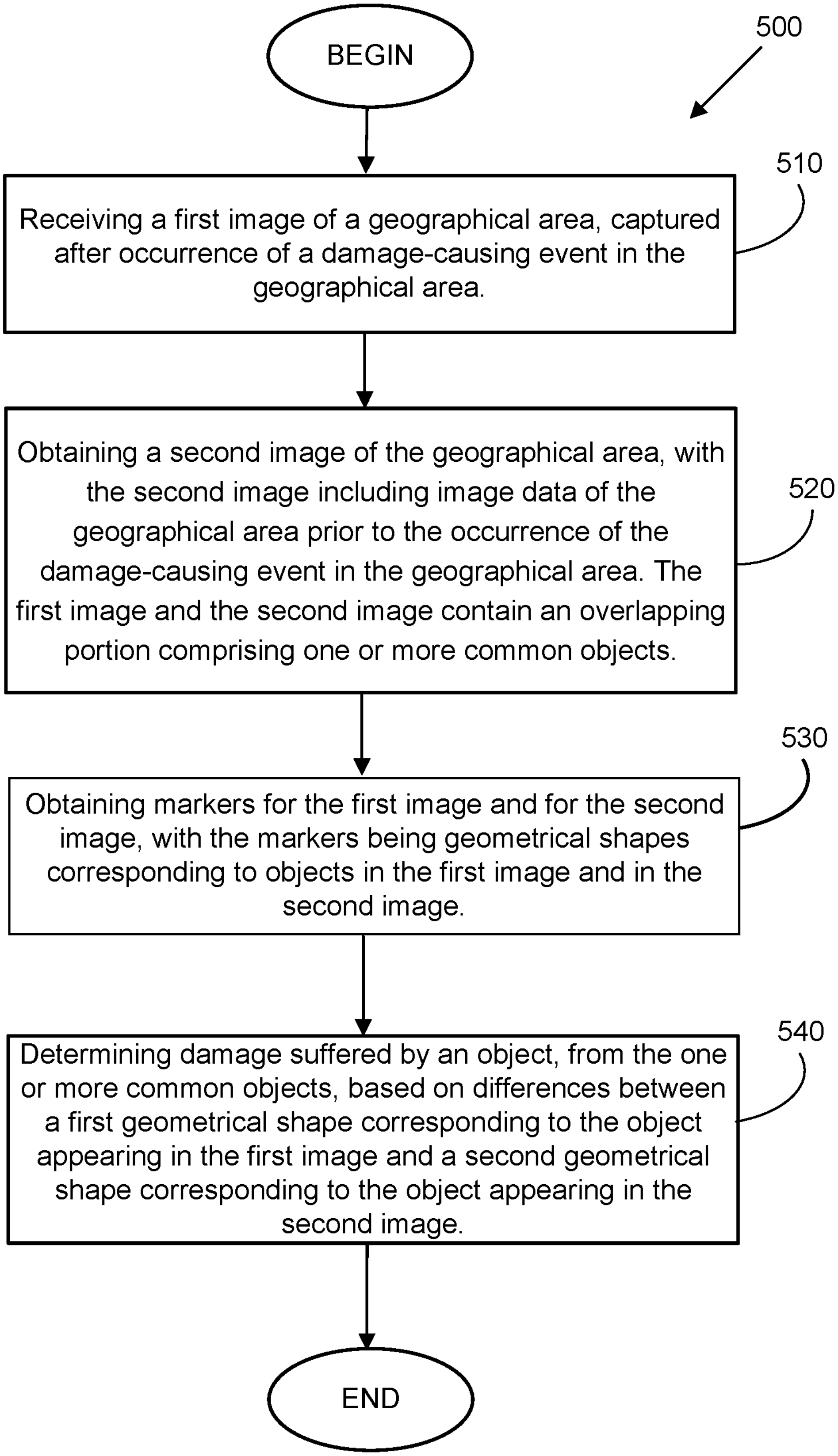
FIG. 5 is a flowchart of an example procedure for detecting damage in a geographical area.

With reference next to FIG. 5, a flowchart of an example procedure 500 to detect damage (and optionally assess the extent of the damage) to structures identifiable in a captured image of a geographical area is shown. The procedure 500 may be performed using a system such as the damage detection system 200 depicted in FIG. 2 or, the system 150 shown in FIG. 1. The procedure 500 includes receiving 510 a first image of the geographical area, with that first image having been captured after occurrence of a damage-causing event in the geographical area (this image is the post-image of a pre- and post-image pair described herein). The procedure 500 further includes obtaining 520 a second image of the geographical area, with the second image including image data of the geographical area prior to the occurrence of the damage-causing event in the geographical area (the second image is the pre-image in the pre-post image pair). The first and second images contain an overlapping portion (which may comprise the entire image) that includes one or more common objects.

As noted, the second image may have been captured by a light-capture device (e.g., a camera) that is different or the same as the light-capture device that captured the first image (i.e., the post-damage-causing event image). In some examples, the second image may alternatively be a digital surface model image (DSM), obtained from a third-party, with image data representative of the features of the geographical area prior to the occurrence of the damage-causing event. The second image may thus be derived or generated from earlier images (which may not necessarily be overhead images) of the geographical area, and/or from other sources of data, including radar data, topographical data, maps, and so on. Other types of image representations of the geographical area may also be obtained and used for the analysis/processing described herein. In some embodiments, the first image may also be a derived image (e.g., a DSM image) rather than an optically-captured image. Image representations for either the first or second image can be obtained from any number of sources (ground level images, radar images, multi-band images, etc.)

In some embodiments, obtaining the second image may include selecting the second image from a repository of baseline images for different geographical areas based on information identifying the geographical area associated with the second image. For example, the platform on which the image-capture device that captured the just received first image (the post-image) may also include inertial sensors and/or other types of navigation devices (e.g., a global navigation satellite system receiver to receiver transmissions from navigation satellites) to compute positioning information (e.g., according to multilateration position determination procedures) for the platform and/or the image-capture device mounted thereon. The geo-referencing data computed based on the navigation information acquired by the various sensors on the platform can be used to access a repository of baseline images containing previously acquired images that are associated with geo-reference data. A baseline image(s) with the closest match to the currently computed geo-referencing data for the first image (corresponding to the post-image captured after occurrence of the damage-causing event) is selected for further processing (in embodiments where a baseline image is to be used for alignment and/or damage determination purposes). In some embodiments, the second image may have been received from a remote storage location. In some embodiments, the first image and the second image of the geographical area include aerial photos of the geographical area captured by image capture devices on one or more of, for example, a satellite vehicle (such as the satellite vehicle 120 of FIG. 1), and/or a low-flying aerial vehicle (such as the plane 122 of FIG. 1).

With continued reference to FIG. 5, the procedure 500 also includes obtaining markers 530 for the first image and for the second image, with the markers being geometrical shapes corresponding to objects in the first image and in the second image. Examples of geometrical shapes that can be used to represent features/objects in either of the images include points, lines, circles, and/or polygons. However, other representations may be used to mark objects/features in the images, such as letters, or other labels. In some implementations, obtaining the markers for the first image and for the second image may include deriving outlines for at least the one or more common objects appearing in the first and second images. As described herein, deriving the outlines for the at least the one or more common objects may include deriving the outlines based on one or more of, for example, a learning model (implemented on a learning engine such as the learning engine 230 illustrated in FIG. 2) to determine the outlines for the at least the one or more common objects, or filtering-based processing (e.g., implemented on a processor-based device such as the one used for realizing the filter-based outline generator 226 depicted in FIG. 2) to determine the outlines for the at least the one or more common objects. As noted, when implemented using a learning model, the learning engine can be trained (using images, stored in the repository 212 or in a dedicated repository 222 of the outline generating engine 220) from different geographical locations, providing image data with different perspectives and resolutions) to identify and generate the outlines/contours of structures and objects that can be discerned in the images processed. When using a filter-based outline generator (e.g., one implementing algorithmic image processing tools), the outline generator can detect edges, outlines, and other artefacts in an image, and produce markers (e.g., geometrical shapes or representations) that can be used for further processing. The generation of geometrical representations (be it polygonal outlines, or otherwise), by a learning engine or more traditional filtering-based techniques, achieves a normalization of the features detectable in images (to mitigate discrepancies in resolution and viewing perspectives of captured images), that can simplify and increase accuracy for damage detection and estimation approaches based on image data.

In some embodiments, the current image and the baseline image may have their outlines generated via different approaches, with a learned model for determining outlines applied to the current image, and a filtering-based technique applied to the baseline image. It is to be noted that the outlines for the baseline images do not need to be generated in runtime, but can be produced at an earlier time and stored in the baseline image repository together with the source image (alternatively, only the outlines produced for a baseline image may be stored, without storing the source image data).

As further shown in FIG. 5, the procedure 500 additionally includes determining 540 damage suffered by an object, from the one or more common objects, based on differences between a first geometrical shape corresponding to the object appearing in the first image and a second geometrical shape corresponding to the object appearing in the second image. In some examples, determining the damage suffered by the object may include determining the damage suffered by the object based on a learning model to determine damage (implemented on a learning engine such as the learning engine 210 of FIG. 2). In embodiments in which the outlines are generated (at least for the current image) using a learning engine (such as the learning engine 230 of FIG. 2), the learning model to determine the damage may be independent of the learning model to determine the outlines for the at least the one or more common objects. The learning model to determine the outlines and the learning model to determine damage may be implemented using one or more neural networks learning engines.

As noted, the determination of damage may be based on a differential approach that is implemented based on a learning model, in which outlines of a current images and outlines of a baseline image are provided as input to a trained learning engine configured to identify, using its learned model, differences between the current and baseline data. Alternatively and/or additionally, the differential approach may be implemented using a filtering approach (also referred to as an analytic or algorithmic approach). In the filtering-based approach, the damage detector is configured to detect and/or assess damage according to computations applied to the geometric properties of the outlines. For example, damage to an object can be determined according to differences in the areas enclosed by the outlines for a particular object appearing in the current and baseline images. Alternatively, detection and assessment if damage can be computed according to differences in the properties defining line segments of polygonal outlines representing a particular object/feature in the baseline and current images (e.g., number of line segments, lengths and orientations of the line segments, etc.) Thus, in such embodiments, determining the damage suffered by the object may include computing one or more of, for example, difference in a first area enclosed by a first outline of the object in the first image and a second area enclosed by a second outline of the object in the second image, and/or differences between properties of a first set of line segments of the first outline of the object in the first image and properties of a second set of line segments of the second outline of the object in the second image.

Figure 8:
FIG. 8 is an example illustration of outline representations in a digital surface model (DSM) pre-image and in a post-image captured by a light-capture device.

When damage detection is implemented based on a differential approach, the baseline data used may be a previously captured image (e.g., captured using a light-capture device such as charge-coupled device (CCD)-based capture device, a CMOS-based image sensor, etc., to produce still or moving images, or may include an image representation generated based on some other type of information. For example, as noted, a baseline image (stored in the repository 212 that includes baselines images in one or more representation types) may be a digital surface model (DSM) image generated from one data representative of features of the geographical area (e.g., using one or more ground photos, possibly supplemented with other data of the physical features of the geographical area, such as radar data, topographical data, etc.) FIG. 8, for example, illustrates a pre-image 810 (i.e., a baseline image) that is a DSM generated image, compared against a post-image 820 which, in this example, was captured using a more traditional light-capture device of the same geographical area (the images 810 and 820 may need to be aligned before a comparison to determine damage can be performed). Prior to performing a differential damage detection procedure (through a learning engine or a filtering-based process) outlines for identifiable structures in the images are performed. The current image may undergo contemporaneous outline detection by, for example, the outline generating engine 220, while the pre-image may have previously been processed to generate its detectable outlines, or may undergo contemporaneous outline generating processing at substantially the same time as the current image 820. As noted, the pre-image is a DSM image that may have been generated from third-party sources that may have included, for example, ground-level photographs of different regions within the geographical area, map data, radar data, topographical data, etc.

It is to be noted that because of differences between the types and level of detail for the respective baseline image and the current (post) image, the resultant outlines (while still providing a relatively reliable normalized basis upon which to compare structural features appearing in the images) may nevertheless not be perfectly matched. Therefore, when different image types are being compared using the differential approach, some threshold adjustment to take into account potential inaccuracies or noise attributable to the difference in image types may be needed. For example, as can be seen in FIG. 8, an outline 812 is generated for the middle structure appearing in the DSM image 810. That outline 812 corresponds to the outline 822 generated from the overhead image 810 for the same middle structure. The outlines 812 and 822 do not perfectly match, but the lack of congruency may not necessarily be as a result of damage that may have occurred to the structure, but rather may be attributable to the different image types that are being compared. Thus, in the example of FIG. 8, a determination that damage may have occurred might require a higher degree of differences between the outlines than what would be required if outlines generated from the same image types were being compared. Additionally, in some embodiments, additional indicia may be required before differences between outlines are deemed to correspond to damage suffered to the structure being analyzed. For example, determination of damage may be made for the structure with the outline 822 if the difference (e.g., in terms of areas enclosed by the outlines compared) exceeds some threshold, and the shapes of the outline 822 is one consistent with damaged structures (e.g., the outline has discontinuities, jagged lines, etc.) In the example of FIG. 8, although the outlines 812 and 822 do not perfectly match, depending on the sensitivity of the damage detection process (such sensitivity may be adjustable by a user), a determination may be made that the difference in the outlines 812 and 822 is one that could possibly be attributed to noise.

It is also to be noted that, in some embodiments, the post-image (the "first image" referred to in relation to the procedure 500) may also be a generated image (e.g., DSM image), and not necessarily a traditional image captured by a light-capture device.

In some embodiments, the procedure 500 for detecting damage may additionally include aligning the first image and the second image according to one or more of, for example:

1) A first alignment procedure that includes aligning the first image and the second image according to geo-referencing information associated with the first image and the second image.
2) A second alignment procedure that includes deriving outlines for the at least the one or more common objects in the first image and in the second image, and aligning at least some of the outlines in the first image with respective at least some of the outlines in the second image. The second alignment procedure may further include excluding at least one of the derived outlines determined to correspond to a respective at least one object, from the one or more common objects in the first image and in the second image, that was damaged during the occurrence of the damage-causing event. In such embodiments, aligning the first image and the second image may include aligning the first image and the second image based on a set of outlines, selected from the derived outlines for the at least the one or more common objects, excluding the at least one of the derived outlines.
3) A third alignment procedure that includes aligning the first image and the second image based on image perspective information associated with the first image and the second image, the image perspective information determined according to measurement data from one or more inertial navigation sensors associated with image capture devices to capture the first image and the second image. The image perspective information may include respective nadir angle information for the first image and for the second image.

Figure 6:
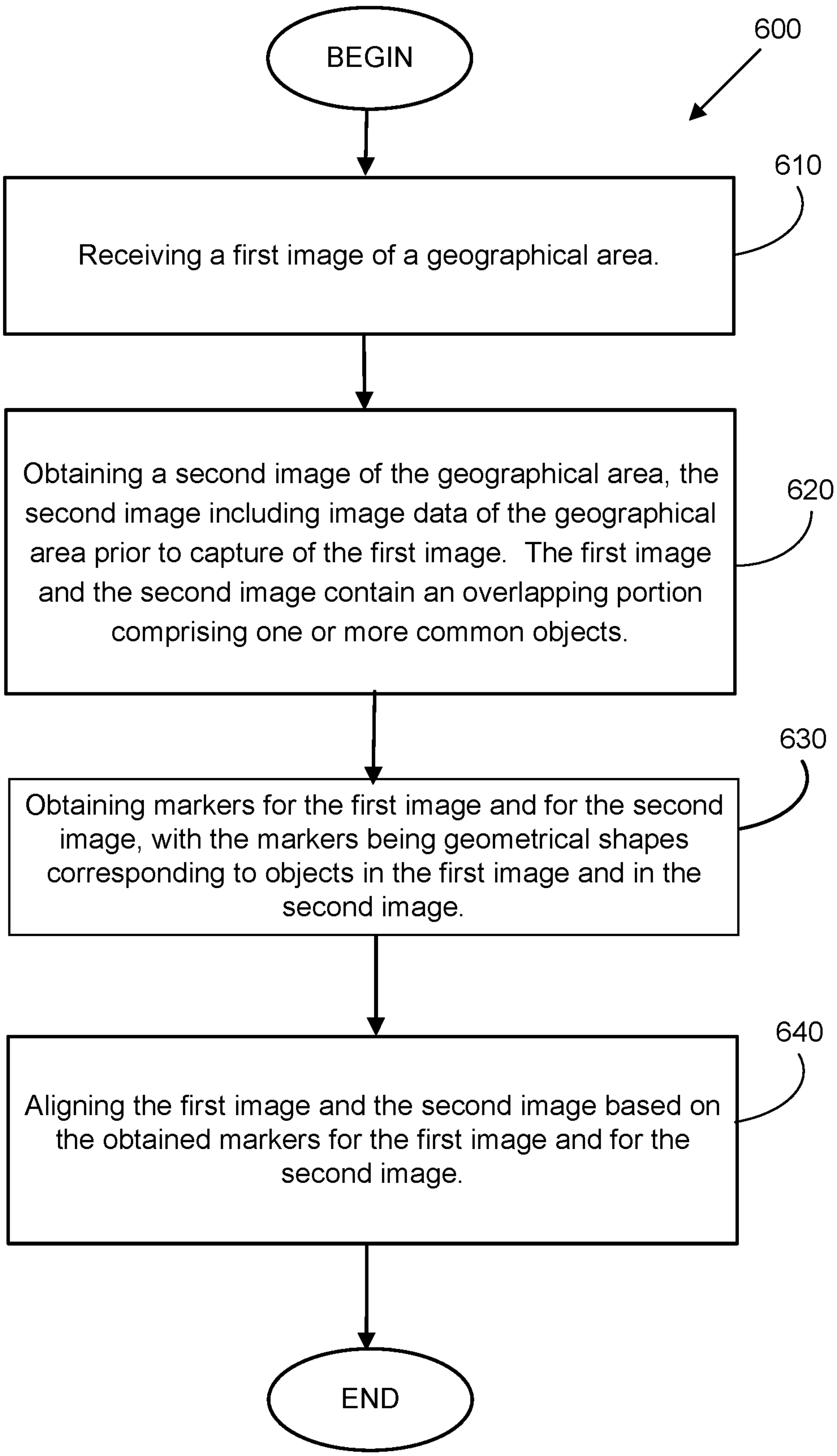
FIG. 6 is a flowchart of an example procedure for image alignment.

Additional details of an alignment procedure using polygonal matching are provided below with reference to FIG. 6, showing a flowchart of an example procedure 600 for image alignment. Like the procedure 500 discussed herein, the alignment procedure 600 may also be performed at the system 150 of FIG. 1 or at the system 200 (e.g., by the pre-processing and data alignment unit 240) depicted in FIG. 2. The procedure 600 includes receiving 610 a first image of a geographical area, and obtaining 620 a second image of the geographical area, the second image including image data of the geographical area prior to capture of the first image. The first image and the second image contain an overlapping portion comprising one or more common objects.

In some examples, obtaining the second image may include selecting the second image from a repository of baseline images for different geographical areas based on information identifying the geographical area associated with the second image (selection of the baseline image may be based on geo-referencing data, and performed in a manner similar to that described above in relation to the procedure 500). In some examples, the first image and the second image of the geographical area include aerial photos of the geographical area captured by image capture devices on one or more of, for example, a satellite vehicle (such as the satellite vehicle 120 in FIG. 1), or an aerial vehicle (such as the plane 122 in FIG. 1).

The procedure 600 further includes obtaining 630 markers for the first image and for the second image, with the markers being geometrical shapes (e.g., a line, a polygon, letters, circles, etc.) corresponding to objects in the first image and in the second image. Obtaining the markers for the first image and for the second image may include deriving outlines for at least the one or more common objects appearing in the first and second images. As discussed herein, in some examples, deriving the outlines for the at least the one or more common objects may include deriving the outlines based on one or more of, for example, a learning model (implemented on a learning engine such as the engine 230 depicted in FIG. 2) to determine the outlines for the at least the one or more common objects, or filtering-based processing (implemented, for example, using the filter-based outline generator 226 of FIG. 2) to determine the outlines for the at least the one or more common objects.

With continued reference to FIG. 6, the procedure 600 includes aligning 640 the first image and the second image based on the obtained markers for the first image and the second image. As noted, in some embodiments, aligning the first image and the second image may include aligning at least some of the outlines in the first image with respective at least some of the outlines in the second image. For example, in some situations the first image may be captured after occurrence of a damage-causing event in the geographical area, and the second image may include image data of the geographical area prior to the occurrence of the damage-causing event in the geographical area. In such situations, an object appearing in the first image (i.e., the image captured after occurrence of a damage-causing event) may be too damaged to have its outline accurately aligned with its respective counterpart outline in the pre-image (the second image), and thus the outline for that object may be excluded from being used for alignment. Accordingly, in such embodiments, aligning the first image and the second image may include excluding at least one of the derived outlines determined to correspond to a respective at least one object, from the one or more common objects in the first and second images, that was damaged during the occurrence of the damage-causing event. Aligning the first image and the second image may then include aligning the first and second images based on a set of outlines, selected from the derived outlines for the at least the one or more common objects, excluding the at least one of the derived outlines.

In some embodiments, the aligning of the first image (e.g., a post-image) with the second image (e.g., a pre-image) may further use one or more other aligning processes to improve the alignment accuracy. For example, aligning the first image and the second image further may include aligning the first image and the second image further according to one or more of:

i. A second alignment procedure including aligning the second image with the first image according to geo-referencing information associated with the first image and the second image; or ii. A third alignment procedure that includes aligning the first image and the second image based on image perspective information associated with the first image and the second image, the image perspective information determined, at least in part, according to measurement data from one or more inertial navigation sensors associated with image capture devices to capture the first image and the second image. Under this alignment procedure, the image perspective information may include respective nadir angle information for the first image and for the second image.

Figure 7:
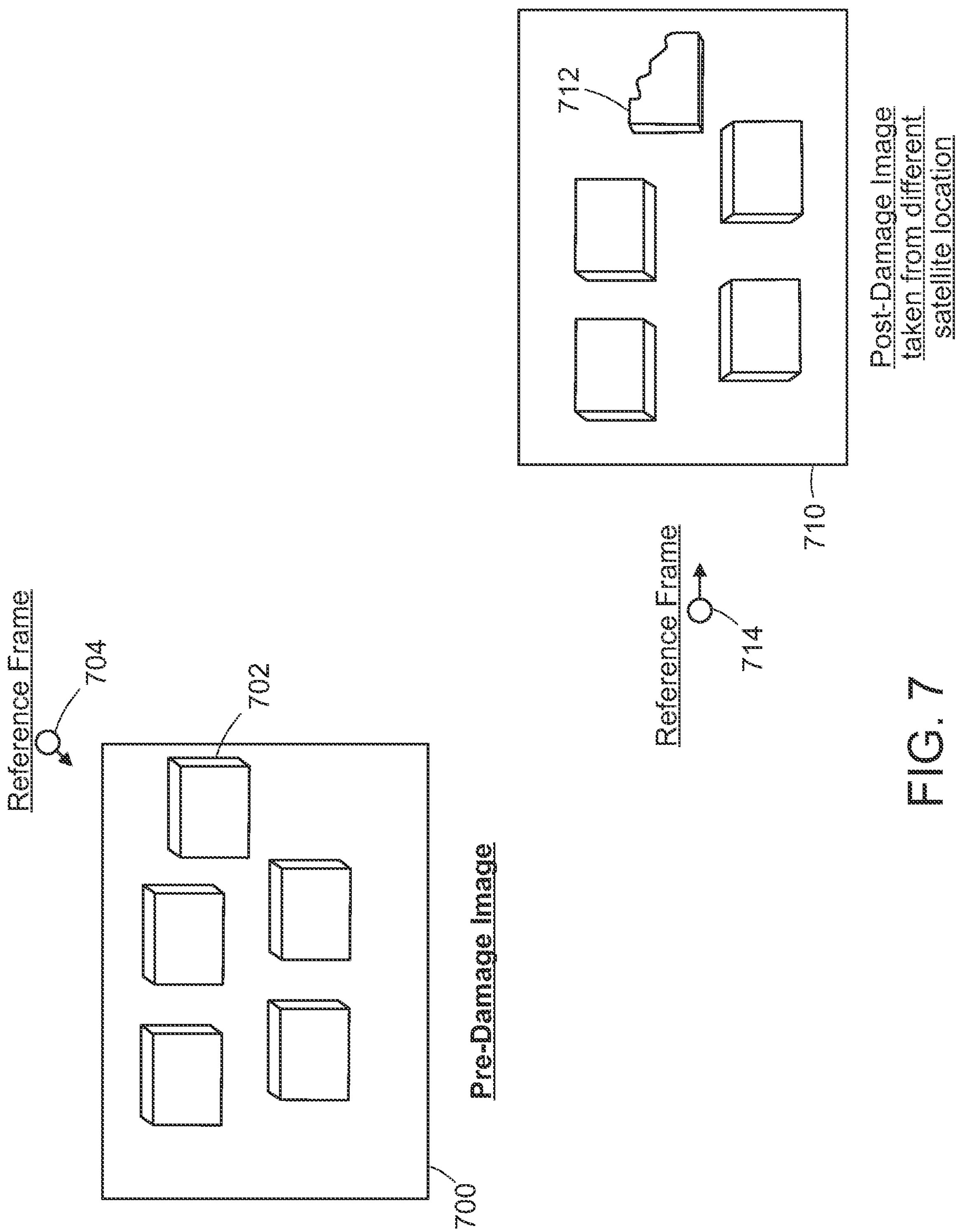
FIG. 7 is an example illustration of outline representations for objects in a pre-image and a post-image that are used as part of an image alignment procedure.

To further illustrate the alignment procedures described herein, including the procedure 600, consider the alignment example of FIG. 7 showing a pre-image 700 of a geographical area, and a post-image 710 (captured post, or subsequent, to an occurrence of a damage-causing event). For the sake of illustration, assume that the pre-image is determined to be a baseline image of the geographical area as determined according to geo-referencing data (e.g., based on a location determination procedure that may rely on measurements by inertial sensors and/or information provided in electromagnetic transmissions from satellite or ground-based transmitters). As can be seen from FIG. 7, the pre- and post-images are captured from different perspectives as illustrated by the different visible portions of the objects appearing in each of the images, and as indicated by the schematically illustrated different frames of reference, 704 and 714, that are associated with the two images. To align the images 700 and 710, the polygonal representations of objects originally appearing in the source images (not shown in FIG. 7) are generated (for example, by the outline generating engine 220 of FIG. 2). The generated outlines are then analyzed (by the outline generating engine, or by some other processing unit, which may be implemented as a learning engine or as a filtering-based processing unit), and the outline 712 is determined to have been damaged (e.g., as may be indicated by its irregular shape, or because of the substantial difference between the outline 712 in comparison to the outline 702 of the pre-image 700). Based on this analysis, the object 712 and its counterpart outline 702 are excluded from the alignment process. Using the remaining outlines for the intact objects, and further based on perspective data (determined according to inertial sensor measurements obtained for each of the images), a transformation matrix can be determined, using image registration optimization procedure, for at least one of the images (either the pre- or post-images) to align it to the frame of reference of the other image. For example, the optimization procedure may be one that minimizes some error function that incorporates constraint terms that are based on image locations for the various polygons representing the intact objects within each of the images, and also incorporates available sensor data about the image perspectives (e.g., orientation and positioning of the image capture devices), to derive the transformation parameters that would transform coordinates of one image to coordinates in the frame of reference of the other image (or to the coordinates in some other frame of reference).

It should be noted that the above alignment procedures (such as the embodiments discussed in relation to FIGS. 6 and 7) can be used in conjunction with any procedure or application that requires alignment functionality, and not only for the damage detection implementations described herein.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for detecting damage in a geographical area, the method comprising:

receiving a first image of the geographical area, the first image having been captured after occurrence of a damage-causing event in the geographical area;

obtaining a second image of the geographical area, the second image including image data of the geographical area prior to the occurrence of the damage-causing event in the geographical area, wherein the first image and the second image contain an overlapping portion comprising one or more common objects;

obtaining markers for the first image and for the second image, wherein the markers are geometrical shapes corresponding to objects in the first image and in the second image;

aligning the first image and the second image according an alignment procedure comprising deriving outlines for the at least the one or more common objects in the first image and in the second image, and aligning at least some of the outlines in the first image with respective at least some of the outlines in the second image, and excluding at least one of the derived outlines determined to correspond to a respective at least one object, from the one or more common objects in the first image and in the second image, that was damaged during the occurrence of the damage-causing event, wherein aligning the first image and the second image comprises aligning the first image and the second image based on a set of outlines, selected from the derived outlines for the at least the one or more common objects, excluding the at least one of the derived outlines; and determining damage suffered by an object, from the one or more common objects, based on differences between a first geometrical shape corresponding to the object appearing in the first image and a second geometrical shape corresponding to the object appearing in the second image, wherein obtaining the markers for the first image and for the second image comprises: deriving outlines for at least the one or more common objects appearing in the first image and in the second image, wherein deriving the outlines for the at least the one or more common objects comprises deriving the outlines based on one or more of: a learning model to determine the outlines for the at least the one or more common objects, or filtering-based processing to determine the outlines for the at least the one or more common objects, wherein determining the damage suffered by the object comprises computing one or more of:

difference in a first area enclosed by a first outline of the object in the first image and a second area enclosed by a second outline of the object in the second image; or differences between properties of a first set of line segments of the first outline of the object in the first image and properties of a second set of line segments of the second outline of the object in the second image.

2. The method of claim 1, wherein determining the damage suffered by the object comprises determining the damage suffered by the object based on a learning model to determine damage, the learning model to determine the damage being independent of the learning model to determine the outlines for the at least the one or more common objects.

3. The method of claim 2, wherein the learning model to determine the outlines and the learning model to determine damage are implemented using one or more neural networks learning engines.

4. The method of claim 1, the aligning of the first image and the second image is further according an alignment procedure comprising aligning the first image and the second image based on image perspective information associated with the first image and the second image, the image perspective information determined according to measurement data from one or more inertial navigation sensors associated with image-capture devices to capture the first image and the second image, wherein the image perspective information includes respective nadir angle information for the first image and the second image.

5. The method of claim 1, wherein the geometrical shapes comprise one or more of: points, lines, circles, or polygons.

6. The method of claim 1, wherein obtaining the second image comprises:

selecting the second image from a repository of baseline images for different geographical areas based on information identifying the geographical area associated with the second image.

7. The method of claim 1, wherein the first image and the second image of the geographical area include at least one of: an aerial photo of the geographical area captured by image-capture device on one or more of a satellite vehicle, or a low-flying aerial vehicle, or a digital surface model (DSM) image.

8. A system comprising:

a communication interface to receive a first image of a geographical area, the first image captured after occurrence of a damage-causing event in the geographical area, wherein the received first image and a second image, including image data of the geographical area prior to the occurrence of a damage-causing event in the geographical area, contain an overlapping portion of the geographical area comprising one or more common objects; and a controller coupled to the communication interface, the controller comprising a processor for executing instructions stored on a non-transitory computer-readable storage medium to:

obtain markers for the first image and for the second image, wherein the markers are geometrical shapes corresponding to objects in the first image and in the second image;

align the first image and the second image according to an alignment procedure comprising deriving outlines for the at least the one or more common objects in the first image and in the second image, and aligning at least some of the outlines in the first image with respective at least some of the outlines in the second image, and excluding at least one of the derived outlines determined to correspond to a respective at least one object, from the one or more common objects in the first image and in the second image, that was damaged during the occurrence of the damage-causing event, wherein aligning the first image and the second image comprises aligning the first image and the second image based on a set of outlines, selected from the derived outlines for the at least the one or more common objects, excluding the at least one of the derived outlines; and determine damage suffered by an object, from the one or more common objects, based on differences between a first geometrical shape corresponding to the object appearing in the first image and a second geometrical shape corresponding to the object appearing in the second image;

wherein obtaining the markers for the first image and for the second image comprises: deriving outlines for at least the one or more common objects appearing in the first image and in the second image, wherein deriving the outlines for the at least the one or more common objects comprises deriving the outlines based on one or more of: a learning model to determine the outlines for the at least the one or more common objects, or filtering-based processing to determine the outlines for the at least the one or more common objects, wherein determining the damage suffered by the object comprises computing one or more of:

difference in a first area enclosed by a first outline of the object in the first image and a second area enclosed by a second outline of the object in the second image; or differences between properties of a first set of line segments of the first outline of the object in the first image and properties of a second set of line segments of the second outline of the object in the second image.

9. A method for image alignment, the method comprising:

receiving a first image of a geographical area;

obtaining a second image of the geographical area, the second image including image data of the geographical area prior to capture of the first image, wherein the first image and the second image contain an overlapping portion comprising one or more common objects;

obtaining markers for the first image and for the second image, wherein the markers are geometrical shapes corresponding to objects in the first image and in the second image; and aligning the first image and the second image based on the obtained markers for the first image and the second image, wherein obtaining the markers for the first image and for the second image comprises:

deriving outlines for at least the one or more common objects appearing in the first image and in the second image, wherein the first image is captured after occurrence of a damage-causing event in the geographical area, and wherein the second image is captured prior to the occurrence of the damage-causing event in the geographical area, and wherein aligning the first image and the second image comprises:

excluding at least one of the derived outlines determined to correspond to a respective at least one object, from the one or more common objects in the first image and in the second image, that was damaged during the occurrence of the damage-causing event;

wherein aligning the first image and the second image comprises aligning the first image and the second image based on a set of outlines, selected from the derived outlines for the at least the one or more common objects, excluding the at least one of the derived outlines.

10. The method of claim 9, wherein deriving the outlines for the at least one or more common objects comprises:

deriving the outlines based on one or more of: a learning model to determine the outlines for the at least the one or more common objects, or filtering-based processing to determine the outlines for the at least the one or more common objects.

11. The method of claim 9, wherein aligning the first image and the second image comprises aligning at least some of the outlines in the first image with respective at least some of the outlines in the second image.

12. The method of claim 9, wherein aligning the first image and the second image further comprises:

aligning the first image and the second image further according to one or more of:

a) a second alignment procedure comprising:

aligning the second image with the first image according to geo-referencing information associated with the first image and the second image; or b) a third alignment procedure comprising:

aligning the first image and the second image based on image perspective information associated with the first image and the second image, the image perspective information determined according to measurement data from one or more inertial navigation sensors associated with image-capture devices to capture the first image and the second image.

* * * * *